United States Patent
Ruschkowski

(10) Patent No.: US 7,280,913 B2
(45) Date of Patent: Oct. 9, 2007

(54) MOTOR VEHICLE NAVIGATION DEVICE HAVING A PROGRAMMABLE AUTOMATIC NOTIFICATION OPERATING MODE

(75) Inventor: Juergen Ruschkowski, Nuremberg (DE)

(73) Assignee: Delphi Technologies, Inc., Troy, MI (US)

( * ) Notice: Subject to any disclaimer, the term of this patent is extended or adjusted under 35 U.S.C. 154(b) by 211 days.

(21) Appl. No.: 11/012,747

(22) Filed: Dec. 15, 2004

(65) Prior Publication Data
US 2005/0137785 A1    Jun. 23, 2005

(30) Foreign Application Priority Data
Dec. 17, 2003    (EP) .................. 03029070

(51) Int. Cl.
G01C 21/26    (2006.01)

(52) U.S. Cl. .................. 701/200; 701/211; 701/213

(58) Field of Classification Search ........... 701/23, 701/25, 26, 200, 211, 208, 213; 340/988; 342/357.06, 357.12, 357.13
See application file for complete search history.

(56) References Cited

U.S. PATENT DOCUMENTS

| 5,177,685 | A | 1/1993 | Davis et al. |
| 6,324,472 | B1 * | 11/2001 | O'Shea ..................... 701/211 |
| 6,622,087 | B2 * | 9/2003 | Anderson .................. 701/209 |

FOREIGN PATENT DOCUMENTS

| DE | 3445668 | 12/1984 |
| DE | 10059746 | 11/2001 |
| EP | 1080975 | 8/2000 |
| JP | 2001052295 | 2/2001 |

* cited by examiner

Primary Examiner—Y. Beaulieu
(74) Attorney, Agent, or Firm—Jimmy L. Funke

(57) ABSTRACT

A motor vehicle navigation device includes an automatic notification operating mode in which the processor automatically initiates the reproduction of a notification text via the loudspeaker at predetermined intervals of time or after predetermined distances of the journey have been traveled.

17 Claims, 1 Drawing Sheet

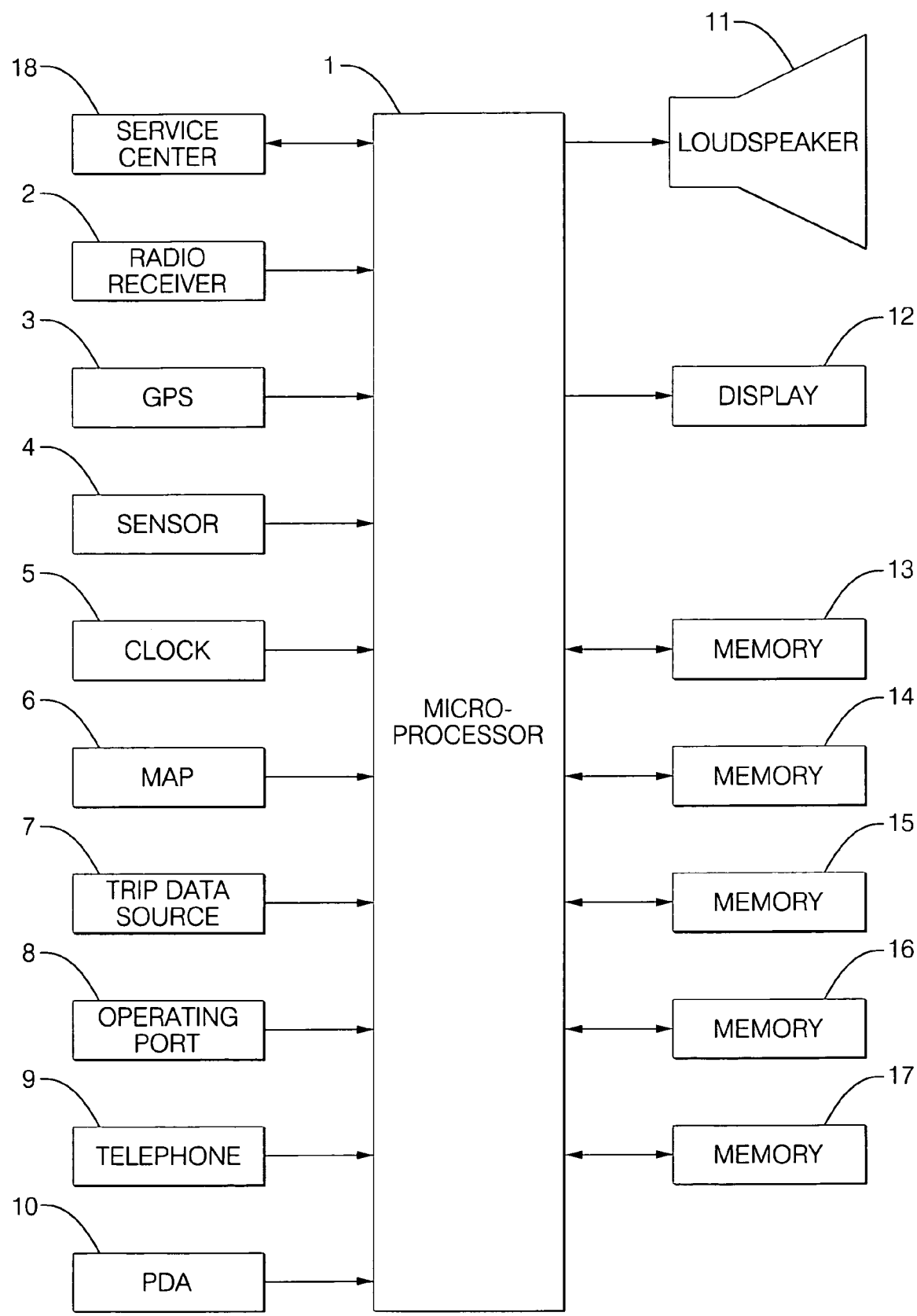

MOTOR VEHICLE NAVIGATION DEVICE HAVING A PROGRAMMABLE AUTOMATIC NOTIFICATION OPERATING MODE

TECHNICAL FIELD

The invention relates to a motor vehicle navigation device.

BACKGROUND OF THE INVENTION

Known motor vehicle comprise a navigation computer, a memory for map data and a display for displaying navigation data. They are further provided with an operator keyboard by means of which the destination of the journey can be entered in the form of alphanumeric destination data. Navigation data can also be reproduced acoustically through loudspeakers.

DE 34 45 668 C1 discloses a control device for a vehicle destination guidance system. In this case the destination of the journey is input by means of a portable hand-held device comprising input keys, a display, a computer and a road map memory chip. Using this hand-held device data can be entered independently of the vehicle. At the start of the journey the hand-held device is inserted in a recess in the instrument panel of the vehicle.

EP 1 080 975 A2 discloses a method and a device for presenting information relevant to the driver or to the journey. This presentation takes place on a display in such a way that the total service life of a component or the total volume of an operating liquid or the total length of a servicing interval or the total length of a route is presented as a graphic element of a certain length. Furthermore, the currently elapsed time or the liquid consumed or left over or the time remaining until the next inspection or the distance covered or still remaining are presented on the same graphic element.

DE 100 59 746 A1 discloses a computer-aided route planning and route guidance system which takes dynamic changes into account both in the traffic situation and in the driver's appointments. This known system also comprises a personalised information pushbutton service. For this purpose the user enters a personal interest profile. During the journey to the destination the known system automatically gives the driver references in good time to objects located along the route travelled matching the personal interest profile.

SUMMARY OF THE INVENTION

The object underlying the invention is to specify a motor vehicle navigation device in which the information for the driver is improved.

This task is solved by a motor vehicle navigation device that includes a processor, a radio reception part connected to the processor and providing traffic report signals to the processor, a GPS reception part connected to the processor and providing positional data to the processor, an input unit connected to the processor and provided for the input of destination details, and a loudspeaker provided for the acoustic reproduction of a notification text, in which the device has an automatic notification operating mode in which the processor automatically initiates the reproduction of the notification text via the loudspeaker at predetermined intervals of time or after predetermined distances of the journey has been traveled.

The advantages of the invention consist in particular in that the driver of the motor vehicle is informed about subjects of interest to him/her automatically at predetermined time intervals or after covering predetermined sections of the route by means of a notification text. This information is given automatically irrespective of the occurrence of live traffic announcements.

Said time intervals and sections of the route are preferably already specified by the manufacturer of the navigation device and stored in the device memory. Advantageously however, these preprogrammed time intervals and sections of the route are alterable or reprogrammable by the user using an input unit. Thus, the driver has the possibility of determining the frequency of notification of these items of information offered to him/her automatically according to his/her own wishes.

Preferably, the automatic notification operating mode according to the invention is activated by the processor in the device only when the calculated distance to the destination or the calculated journey time to the destination is greater than a specified threshold value. By way of example, this threshold value may be an hour's journey time or a distance of 100 kilometres. By means of this measure it is achieved that on short journeys or in trips in relatively large cities automatic notification does not take place since it is often not wanted on such journeys.

In accordance with a preferred embodiment of this invention, a motor vehicle navigation device has the advantage that the driver himself/herself can decide what information is presented to him/her in the course of the automatic notification. For example, he/she has the possibility of being notified exclusively about the remaining journey time forecast until the destination is reached. Alternatively, he/she can be notified about the remaining journey time forecast until the destination is reached and the distance remaining until the destination is reached. These data are data relating to navigation. Another alternative consists in that he/she be notified about vehicle operating data derived from a trip data source on their own or in association with data relating to navigation. The vehicle operating data derived from a trip data source include by way of example the instantaneous driving speed and the instantaneous fuel consumption. Another alternative consists in that the driver be notified about data derived from a sensor unit on its own or in association with the data identified above. The data derived from the sensor unit include by way of example the instantaneous outside temperature. Another component of the automatic notification system can be a road traffic message which has been received by the radio receiver part and temporarily stored in a road traffic message memory in the device. Furthermore, a component of the notification text can be based on data which have been provided by a service centre and likewise temporarily stored in a memory in the device. For example, the data supplied by the service centre can be the current weather report for the destination. As already stated the driver has the possibility of determining in a programming operation which of said components should be included in the notification text automatically reproduced by the loudspeakers and which not.

An advantageous refinement of the invention consists in reproducing the notification text not solely through the loudspeakers in the vehicle but also in additionally presenting it in visual form on the display of the navigation device. This can be done in the form of a static image or in the form of moving text.

BRIEF DESCRIPTION OF THE DRAWINGS

Other advantageous attributes of the invention emerge from the following explanation of an exemplified embodiment with reference to the figure. The latter shows a block diagram of a motor vehicle navigation device according to the invention.

DESCRIPTION OF THE PREFERRED EMBODIMENTS

The device illustrated has a microprocessor 1 for the central control and computing unit whose work program is stored in a non-volatile memory 13. In the exemplified embodiment shown the microprocessor 1 serves inter alia as a navigation computer which determines navigation data from signals fed to it and makes this available to the driver of the motor vehicle in acoustic form via a loudspeaker 11 and/or in visual form via a display 12.

The destination is entered using an input unit which may be an operating part 8, a telephone 9 or a PDA 10. With regard to the destination the street, the house number, the post code and the name of the destination are entered by way of example in alphanumeric form.

Furthermore, the processor 1 is connected to a GPS receiving part 3 which passes to the processor positional data corresponding to the present position of the vehicle. From this positional data, the destination entered and map data stored in a map memory 6 the processor 1 determines the navigational or route data which are transmitted to the driver on the journey to his/her destination in acoustic and visual form. These route data are temporarily stored in a memory 15 and updated as required during the journey.

The route data are reproduced acoustically by using speech modules already deposited in a memory 14 at the factory. The speech modules deposited in the memory 14 are also used in an automatic notification operating mode which is explained in more detail below.

The microprocessor 1 is further connected to a radio reception part 2, a sensor unit 4, a clock 5, a trip data source 7 and a service centre 18.

Traffic messages are received by means of the radio reception part 2 and passed on to the microprocessor 1. The latter, if necessary, ensures interruption of the ongoing program, for example music reproduction from a cassette or CD player, and instantaneous reproduction of the traffic report in question via the loudspeaker 11. The microprocessor 1 further takes the traffic reports into account in the planning of the rest of the route to the destination and if need be alters the previously valid route data in order, for example, to bypass any traffic jam reported.

The sensor unit 4 is used to capture environmental data and comprises a temperature sensor provided to measure the temperature outside the vehicle. The environmental data provided by the sensor unit 4 can be taken into account in determining the remaining driving time until the destination is reached. There is also the possibility, however, of using these environmental data solely for the information of the driver within the framework of the automatic notification operating mode. Other environmental data determined by the sensor unit 4 and passed on for further use to the microprocessor 1 include, for example, the ambient brightness, the humidity of the air outside the vehicle and data describing the state of the carriageway.

The real time information derived from the clock 5 is used by the microprocessor 1 in order to determine the prospective driving time to the destination and the prospective time of arrival at the destination and to inform the driver within the framework of the automatic notification operating mode of the current time, the prospective driving time to the destination and the prospective time of arrival at the destination.

The trip data source 7 provides the microprocessor 1, via the vehicle's CAN bus for example, with information about the vehicle operating parameters. These operating parameters include details of the instantaneous tank filling level, the instantaneous driving speed and the temperature of the engine. The microprocessor 1 uses these data for the purpose, for example, of indicating to the driver via the loudspeaker 11 the need for a fuel stop or, if the engine temperature is too high, of calling on the driver via the loudspeaker 11 to drive more slowly so that the engine temperature can drop again. This information about the vehicle operating parameters can further be used to inform the driver in the course of the automatic notification operating mode about the vehicle operating parameters.

The microprocessor 1 further receives information transmitted automatically by the service centre 18 to which the driver has subscribed. This information may be, for example, weather reports from towns located along the planned journey route and also, inter alia, the weather report for the destination. This information can also be taken into account by the microprocessor 1 in the navigation operation. Furthermore, it is also used to inform the driver of things of interest to him/her as part of the automatic notification operating mode.

The traffic reports received via the radio reception part 2 which relate to the planed journey route are stored in a traffic report memory 16 even when the engine is turned off or the radio reception part 2 is switched off. The traffic reports filed there can be called up as required by the driver of the vehicle by means of the operating unit 8. This is particularly advantageous after a stop on the journey during which the driver spends some time outside the vehicle.

The memory 17 is provided to store all information needed for the automatic notification operating mode. This information includes data relating to navigation, for example details of the route covered so far, the journey time to date, the distance still to be covered and the driving time still required to reach the destination. Furthermore, this information includes the vehicle operating parameters provided by the trip data source 7, the environmental data derived from the sensor unit 4, the traffic reports temporarily stored in the memory 16 and those data supplied by the service centre 18.

The automatic notification operating mode according to the invention is a notification mode which is initiated automatically by the microprocessor 1 during the journey at predetermined time intervals after the start of the journey or after covering predetermined segments of the route. The predetermined time intervals amount, for example, to 30 minutes so that during a relatively long car journey the driver is automatically presented every 30 minutes with an announcement via the loudspeaker 11 containing the text components specified in the previous paragraph. If the automatic notification occurs after predetermined segments of the route have been covered this distance may be 50 km by way of example.

An advantageous refinement of the invention consists in activating the automatic notification operating mode by the microprocessor 1 only when the distance to be covered between the starting point and the destination or the calculated driving time is greater than a specified threshold value. This threshold value is, for example, a driving distance of 100 kilometres or a journey time of one hour. Due to this refinement it is advantageously achieved that when on short journeys, for example when driving into a major city, the automatic notification system does not operate since it is usually unwanted on such trips.

The predetermined segment of the route, the predetermined time intervals and said threshold values are already specified by the manufacturer and are stored in the memory 17 in the course of production in the factory. The user, however, advantageously has the possibility of reprogramming all of these values using the input unit, in particular the operating part 8 and the PDA 10, and in doing so of exercising control of the frequency of the automatic notifications during journeys.

Furthermore, the user has the possibility by programming by means of the input unit, in particular the operating part 8 and the PDA 10, to specify the components of the notification text. In the course of this programming he/she can directly select or exclude individual items of information from each of the notification categories specified above for the automatic notification. An automatic notification may by way of example be worded as follows:

"IT IS NOW 3.00 PM. YOU ARE STILL 100 KILOMETRES FROM YOUR DESTINATION. THE EXPECTED REMAINING JOURNEY TIME IS 1 HOUR. YOUR CURRENT DRIVING SPEED IS 120 KILOMETRES PER HOUR. THERE ARE NO REPORTS OF TRAFFIC JAMS ON YOUR ROUTE. THE CURRENT OUTSIDE TEMPERATURE IS 12° C.".

An alternative automatic message runs as follows:

"YOU ARE NOW 100 KILOMETRES FROM YOUR DESTINATION. YOUR EXPECTED TIME OF ARRIVAL THERE IS 4.00 PM".

An advantageous refinement of the invention consists in that the information that the user has selected for the automatic notification operating mode also be presented in visual form on the display 12 under control by the microprocessor 1. This can be done in the form of a moving text running by way of example only over the lower area of the display. Alternatively, this can also be done in the form of a static image which appears on the display for a predetermined time, for example 20 seconds.

According to another embodiment of the invention the information in the notification text can be displayed exclusively visually on the display 12. In order to draw the driver's attention to the display the start of this presentation on the display 12 may be accompanied by an acoustic signal given by the loudspeaker 11.

The microprocessor 1 is preferably programmed in such a way that in the event of an automatic notification according to the invention clashing in time with a current traffic report it gives priority to the current traffic report.

According to the present invention, therefore, the driver of a motor vehicle is automatically supplied with information by means of a notification text at regular intervals of time or distance during a relatively long journey to a desired destination. The driver can advantageously set the time or distance intervals according to his/her own wishes by means of a programming operation. Furthermore, he/she can also independently determine which information is presented to him/her as part of the automatic notification operating mode.

Another embodiment of the invention consists in dividing the notification text into two groups. One of these groups comprises data of importance to the driver himself/herself relating to driving the vehicle. These include in particular data relating to the navigation of the vehicle. The other group comprises data of a predominantly informative nature destined in particular for other passengers in the vehicle. If, by way of example, the motor vehicle is a tour bus the data belonging to the first group are presented exclusively to the driver and the data belonging to the second group are presented exclusively on displays in the passenger section. Data in the second group includes, for example, information about towns located along the route of the tour. This information is provided by the service centre 18 and temporarily stored in the memory 17 until its reproduction.

The invention claimed is:

1. Motor vehicle navigation device comprising:
    a processor,
    a radio reception part connected to the processor and providing traffic report signals to the processor,
    a GPS reception part connected to the processor and providing positional data to the processor,
    an input unit connected to the processor and provided for an input of destination details, and
    a loudspeaker provided for acoustic reproduction of a notification text,
    characterised in that the motor vehicle navigation device comprises an automatic notification operating mode in which the processor automatically initiates reproduction of the notification text via the loudspeaker at predetermined intervals of time or after predetermined distances of the journey have been travelled.

2. Motor vehicle navigation device according to claim 1, characterised in that the processor activates the automatic reproduction of the notification text only when a distance to be travelled between a starting point and a destination or a calculated driving time is greater than a specified threshold value.

3. Motor vehicle navigation device according to claim 1, characterised in that it comprises a memory for storing data corresponding to the predetermined time intervals or the predetermined distances of the journey.

4. Motor vehicle navigation device according to claim 3, characterised in that the data corresponding to the predetermined time intervals or distances of the journey are preprogrammed.

5. Motor vehicle navigation device according to claim 3, characterised in that the input unit is provided for altering the predetermined time intervals or the predetermined distances of the journey.

6. Motor vehicle navigation device according to claim 1, characterised in that the input unit is provided for selecting components of the notification text.

7. Motor vehicle navigation device according to claim 6, characterised in that the motor vehicle navigation device comprises a memory part which is provided for storing information about the selected components of the notification text.

8. Motor vehicle navigation device according to claim 1, characterised in that data relating to navigation are a component of the notification text.

9. Motor vehicle navigation device according to claim 1, characterised in that information about vehicle operating parameters derived from a trip data source are a component of the notification text.

10. Motor vehicle navigation device according to claim 1, characterised in that a component of the notification text is based on data derived from a sensor unit.

11. Motor vehicle navigation device according to claim 10, characterised in that the sensor unit is provided for capturing at least one environmental parameter.

12. Motor vehicle navigation device according to claim 1, characterised in that traffic reports received by the radio reception part and temporarily stored in a traffic report memory are a component of the notification text.

13. Motor vehicle navigation device according to claim 1, characterised in that a component of the notification text is based on data provided by a service centre.

14. Motor vehicle navigation device according to claim 1, characterised in that the processor initiates automatic reproduction of the notification text in visual form on the display.

15. Motor vehicle navigation device according to claim 14, characterised in that the notification text is reproduced in visual form in the form of a moving text.

16. Motor vehicle navigation device according to claim 14, characterised in that the notification text is reproduced in visual form in the form of a static image.

17. Motor vehicle navigation device according to claim 1, characterised in that the notification text is divided into two groups, a first of said groups comprising items of information to be presented to a driver of the motor vehicle and a second of the groups comprising items of information to be presented to other passengers of the motor vehicle.

* * * * *